United States Patent
Gerner et al.

(10) Patent No.: US 7,947,112 B1
(45) Date of Patent: May 24, 2011

(54) METHOD FOR DEGASSING A FLUID

(75) Inventors: Yuri Gerner, Mendota Heights, MN (US); Carl W. Sims, St. Paul, MN (US); Jonathan Thompson, Center City, MN (US)

(73) Assignee: Rheodyne, LLC, Roseville, MN (US)

(*) Notice: Subject to any disclaimer, the term of this patent is extended or adjusted under 35 U.S.C. 154(b) by 336 days.

(21) Appl. No.: 12/174,099

(22) Filed: Jul. 16, 2008

Related U.S. Application Data

(60) Provisional application No. 60/950,030, filed on Jul. 16, 2007.

(51) Int. Cl.
*B01D 53/22* (2006.01)

(52) U.S. Cl. .............. 95/46; 95/1; 95/8; 95/26; 95/47; 95/54; 95/82; 95/241; 95/247; 96/6; 96/102; 96/104; 96/417; 96/424; 210/640; 210/656

(58) Field of Classification Search ............ 95/8, 26, 95/45, 46, 47, 54, 82, 1, 241, 247, 266; 96/4, 96/6, 101, 102, 103, 104, 417, 424; 210/640, 210/656

See application file for complete search history.

(56) References Cited

U.S. PATENT DOCUMENTS

| | | | |
|---|---|---|---|
| 2,962,114 A | 11/1960 | Medearis |
| 3,255,576 A | 6/1966 | Dawkins |
| 3,325,974 A | 6/1967 | Griffin, III |
| 3,616,599 A | 11/1971 | Burnham |
| 3,769,779 A | 11/1973 | Liljestrand |
| 3,856,483 A | 12/1974 | Rumpf |
| 3,895,927 A | 7/1975 | Bornham, Sr. |
| 4,030,897 A | 6/1977 | Pelzer |
| 4,046,528 A | 9/1977 | Liljestrand |
| 4,088,457 A | 5/1978 | Phillips |
| 4,201,555 A | 5/1980 | Tkach |
| 4,315,760 A | 2/1982 | bij de Leij |
| 4,324,557 A | 4/1982 | Wegstedt |
| 4,331,458 A | 5/1982 | Liljestrand |
| 4,358,299 A | 11/1982 | Jensen |
| 4,362,536 A | 12/1982 | Fullichsen |
| 4,411,673 A | 10/1983 | Jones |
| 4,461,632 A | 7/1984 | Banos |
| 4,600,413 A | 7/1986 | Sudgen |
| 4,715,869 A | 12/1987 | Ramshaw |
| 4,908,048 A | 3/1990 | Hofmann |
| 4,921,400 A | 5/1990 | Niskanen |
| 5,182,031 A | 1/1993 | Lamort |
| 5,190,515 A | 3/1993 | Eaton |

(Continued)

FOREIGN PATENT DOCUMENTS

DE 3720903 A1 1/1989

(Continued)

*Primary Examiner* — Jason M Greene
(74) *Attorney, Agent, or Firm* — Haugen Law Firm PLLP

(57) ABSTRACT

A method for degassing a fluid includes providing a degassing system having a degassing module and a fluid pump apparatus having a fluid reservoir, wherein the fluid pump apparatus is operated in a discontinuous mode involving one or more discrete pumping cycles having a first cycle time. The fluid pump apparatus is calibrated to deliver a predetermined volume of the fluid from the fluid reservoir during each of the pumping cycles, and the degassing module is adapted to operably move gas from the fluid to an extent sufficient to render the fluid volume to a desired degassed condition within a period of time that is not greater than the first cycle time.

6 Claims, 1 Drawing Sheet

U.S. PATENT DOCUMENTS

| | | | |
|---|---|---|---|
| 5,324,166 A | 6/1994 | Elonen | |
| 5,571,310 A * | 11/1996 | Nanaji | 96/4 |
| 5,749,945 A | 5/1998 | Beck | |
| 5,762,684 A * | 6/1998 | Hayashi et al. | 95/24 |
| 5,858,067 A | 1/1999 | McManus | |
| 5,861,052 A | 1/1999 | Meinander | |
| 5,871,566 A * | 2/1999 | Rutz | 96/6 |
| 5,980,742 A * | 11/1999 | Saitoh | 95/46 |
| 5,993,518 A | 11/1999 | Tateyama | |
| 6,066,111 A | 5/2000 | Brockhoff | |
| 6,139,606 A | 10/2000 | Forslund | |
| 6,142,748 A | 11/2000 | Harris | |
| 6,364,934 B1 * | 4/2002 | Nandu et al. | 95/46 |
| 6,402,810 B1 * | 6/2002 | Mayer et al. | 95/46 |
| 6,629,821 B1 | 10/2003 | Yokota | |
| 6,723,205 B1 | 4/2004 | Meinander | |
| 6,837,992 B2 * | 1/2005 | Gerner et al. | 95/46 |
| 6,955,706 B2 * | 10/2005 | Varrin et al. | 95/46 |
| 7,381,241 B2 | 6/2008 | Tessien | |
| 2002/0017193 A1 | 2/2002 | Ramos | |
| 2005/0100477 A1 * | 5/2005 | Anderson et al. | 422/70 |
| 2005/0166901 A1 * | 8/2005 | Phelps | 123/505 |
| 2006/0064954 A1 | 3/2006 | Yokota | |
| 2006/0120858 A1 | 6/2006 | Taylor | |
| 2006/0231076 A1 * | 10/2006 | Magel | 123/446 |
| 2007/0163433 A1 * | 7/2007 | Chen et al. | 95/46 |
| 2007/0267156 A1 | 11/2007 | Gommel | |

FOREIGN PATENT DOCUMENTS

| | | |
|---|---|---|
| DE | 4424779 A1 | 1/1996 |
| DE | 10041555 | 3/2002 |
| EP | 648523 B1 | 3/1998 |
| GB | 768537 | 2/1957 |
| GB | 2236264 | 4/1991 |
| WO | WO-93-22563 | 11/1993 |
| WO | WO98-08990 | 3/1998 |
| WO | WO-2006-053944 | 5/2006 |

* cited by examiner

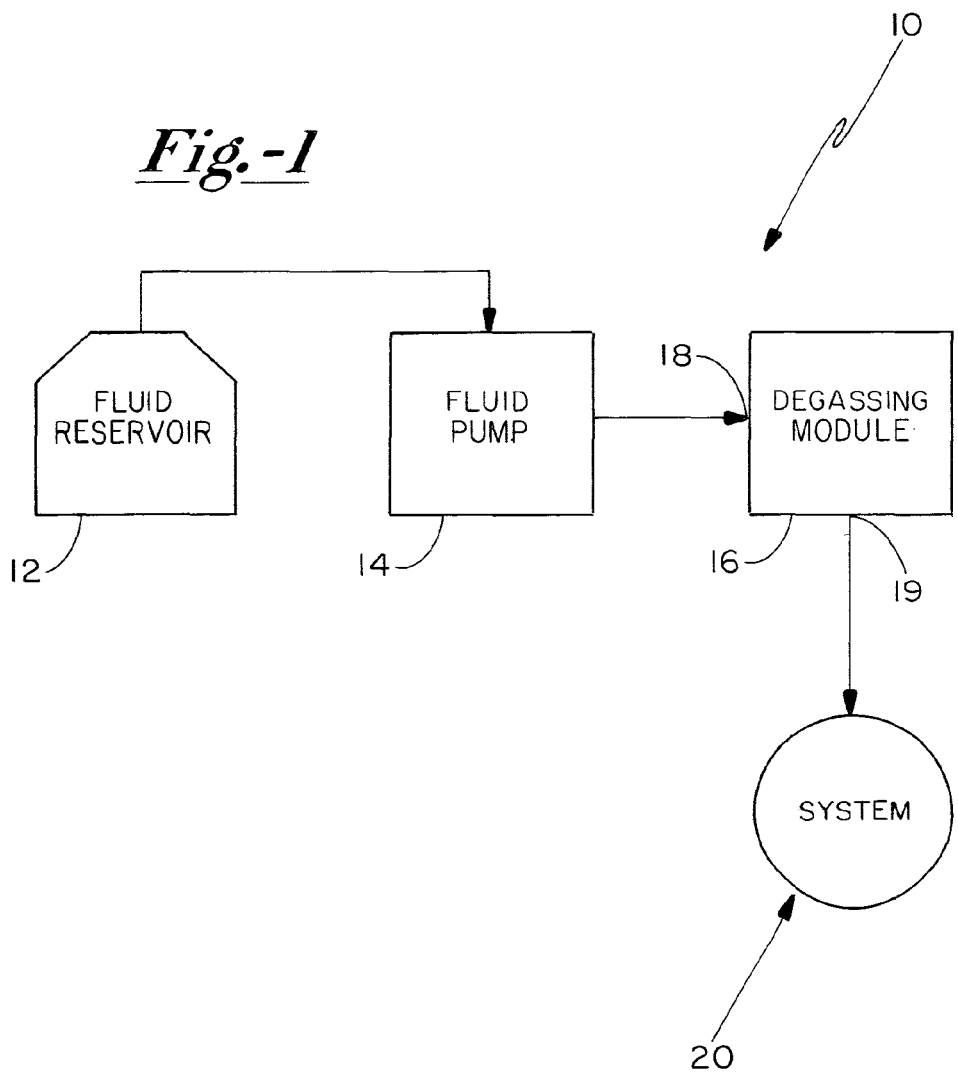

METHOD FOR DEGASSING A FLUID

CROSS REFERENCE TO RELATED APPLICATIONS

This applications claims priority from U.S. Provisional Patent Application Ser. No. 60/950,030, filed on Jul. 16, 2007 and entitled "Method for Degassing a Fluid", the content of which is incorporated herein in its entirety.

FIELD OF THE INVENTION

The present invention relates to fluid degassing systems generally, and more particularly to methods for designing and constructing fluid degassing systems, wherein the degassing capacity of the system is calibrated in connection with a throughput fluid flow rate and a predetermined maximum gas concentration in the conditioned fluid.

BACKGROUND OF THE INVENTION

The removal of entrained gases from liquids is an important exercise in a variety of manufacturing and/or analytical processes. An example process in which liquid degassing is widely utilized is in liquid chromatography applications. The presence of dissolved gases can be undesirable in such applications, wherein the presence of dissolved gases interferes with the functionality or accuracy of the application.

In the case of liquid chromatography, for example, dissolved gases in chromatographic mobile phase can manifest itself in the form of bubbles, which can cause noise and drift in the chromatographic detector. Moreover, the existence of gas bubbles can cause erroneous absorption signatures at the detector.

Many other liquid supply applications rely upon degassed liquids in order to achieve and preserve consistent and high quality results. Such applications include, for example, ink delivery systems such as in ink-jet printers, semi conductor wafer manufacturing processes, and pharmaceutical manufacturing.

Gas infiltration into liquid feed stocks may originate from a variety of sources. For example, liquid supply reservoirs and pipelines are not typically maintained under sealed conditions, and are therefore sources of liquid feed stock gasification. While many systems for degassing liquids have been developed and implemented, such systems have not heretofore been manufactured to a capacity and performance specifically tailored to meet the needs of a particular degassing application. More typically, degassing systems have traditionally been configured to ensure minimum degassing performance by being "over-sized" with respect to the infeed liquid flow rate and the extent of degassing required. In doing so, however, functioning elements of the degassing system are typically not utilized to their full potential. Such unused capacity may incur significant unnecessary expense and degassing system size requirements, which sizing requirements can prevent advantageous degassing system size reductions in, for example, analytical system componentry.

Accordingly, it is a principle object of the present invention to provide a method for degassing a fluid, which method involves the use of a degassing module that is specifically configured to meet the needs of a particular degassing application.

It is a further object of the present invention to provide a degassing module in a degassing system that is adapted to provide only the necessary performance in a particular degassing application.

SUMMARY OF THE INVENTION

By means of the present invention, fluid degassing systems may be implemented for efficiently and economically attaining desired performance in a particular degassing application. Moreover, a degassing system may be customized to provide needed degassing performance based upon input variables, such as fluid type, fluid temperature, and fluid throughput flow rate. As such, the custom degassing system may be arranged to suit the particular use within a particular degassing installation.

In one embodiment, a method for degassing a fluid includes providing a degassing system having a degassing module and a fluid pump apparatus including a fluid reservoir. The method further includes operating the fluid pump apparatus in a discontinuous mode involving one or more discrete pumping cycles having a first cycle time. The fluid pump apparatus is calibrated to deliver a predetermined volume of fluid from the fluid reservoir during each of the pumping cycles. The degassing module is adapted to operably remove gas from the fluid to an extent sufficient to render at least a maximum of the predetermined fluid volume to no greater than a predetermined maximum gas concentration within a period of time that is not great than the first cycle time.

In some embodiments, the fluid pump is a syringe-type pump and the degassing efficiency of the degassing module may be adjustable. Adjustment to the degassing efficiency may be accomplished by, for example, replacing the first separation membrane with a second separation membrane having different permeation or selectivity characteristics from the first separation membrane, changing separation membrane contact area within the degassing module, and changing a gas pressure at a permeate side of the separation membrane. Such gas pressure at the permeate side may be total pressure, or may be partial pressure exerted by a target gas species.

BRIEF DESCRIPTION OF THE DRAWINGS

FIG. 1 is a schematic diagram of a degassing system of the present invention.

DETAILED DESCRIPTION OF THE PREFERRED EMBODIMENTS

A typical degassing system that may be incorporated in, for example, a liquid chromatography apparatus, is illustrated in FIG. 1, and is designated by reference number 10. The schematic diagram of FIG. 1 demonstrates a degassing system having a liquid reservoir 12 that is fluidly coupled to a pump 14 for pumping liquid contained in reservoir 12 through an associated system requiring pumped fluid, such as a liquid chromatography system 20. In many applications, fluid being pumped to and through system 20 is desirably degassed at least to a tolerance level in which gaseous species within the fluid do not interfere with the functionality and/or accuracy of system 20. To do so, such applications typically utilize a degassing module 16 to remove at least a portion of any gaseous species contained in the fluid being delivered to system 20.

Degassing module 16 may be provided in any of a variety of arrangements for removing gas from a fluid. Such arrangements may be configured and adapted to remove dissolved gases, gas bubbles, and the like from the fluid. Example degassing arrangements which are deemed useful as degassing module 16 in the present invention include, for example, those arrangements and processes described in U.S. patent application Ser. No. 11/457,386 entitled "Integrated Degassing and Debubbling Apparatus"; and U.S. Pat. Nos. 6,248,157; 6,494,938; 6,596,058, 6,949,132; and 7,144,443, the contents of each of such patents and patent applications being incorporated herein in their entirety. Applicants, however, believe that the method of the present invention is not limited to the configurations, materials, and processes described in the above-cited patents and patent applications, and that other fluid degassing arrangements, materials, and processes may also be useful in the present application. It is further contemplated that the above-cited patents and patent applications are useful in demonstrating example degassing systems, including example fluid pump arrangements drawing fluid from respective fluid reservoirs.

In some systems, fluid pump 14 is operated in a discontinuous mode which involves one or more discrete pumping cycles having an associated cycle time. In some embodiments, such a discontinuous mode involves discrete "pulses" of fluid being driven to system 20. Applicants have determined that delivery to system 20 of fluid having consistent characteristics, and particularly consistent and predictable gaseous species concentrations, is preferable for enabling predictable operation and results from system 20. As such, Applicants have discovered that consistent and predictable gas concentrations in the fluid delivered to system 20 may be accomplished through a customized design of degassing module 16 based upon the characteristics of the fluid being processed by degassing module 16, and by the operating parameters of fluid pump 14. In particular, degassing module 16 may be adapted to operably remove gas from the fluid at a rate or efficiency that is calibrated with reference to, for example, fluid type, initial gas concentration, fluid volume delivered to degassing module 16 in each discontinuous pumping cycle, and the time between each discrete pumping cycle.

In one embodiment, fluid pump 14 may be calibrated to deliver a predetermined volume of the fluid from fluid reservoir 12 during each discrete pumping cycle while operating in a discontinuous mode. An example of a discrete pumping cycle is a full intake stroke and full expunge stroke of a plunger in a syringe-type fluid pump. Such a syringe-type pump is an example of a fluid pump that may be operable in a discontinuous mode, as described above. An example syringe-type fluid pump useful in the present invention is a PVM available from Sapphire Engineering of Pocasset, Mass. A syringe-type fluid pump 14 may deliver, for example, a predetermined volume of fluid to degassing module 16 during each of the pumping cycles. In addition, fluid pump 14 may be controlled to a known cycle time, which is defined as the time required to complete a full operating cycle of fluid pump 14. In the example of a syringe-type pump, a full operating cycle may be defined by a full intake stroke and full expunge stroke of the syringe plunger.

Degassing module 16 may be adapted to operably remove gas from the fluid to an extent sufficient to render a predetermined fluid volume delivered thereto by fluid pump 14 to a predetermined maximum gas concentration within a period of time that is not greater than the predetermined cycle time. In other words, degassing module 16 may preferably be configured, arranged, and/or controlled to perform degassing upon fluid entering degassing module 16 at inlet 18 at a rate which guarantees that fluid exiting from degassing module 16 at outlet 19 contains no greater than a predetermined maximum gas concentration desired for operation in and/or evaluation by system 20. In one embodiment, configuration, arrangement, and/or control of degassing module 16 is based upon discontinuous fluid flow from fluid pump 14 at discrete predetermined fluid volumes.

A variety of degassing characteristic variables may be adjusted in order to perform as described above. Moreover, such degassing characteristic variables may be operably adjusted through, for example, a feedback control loop providing degassing module 16 with information on incoming fluid, with such information including parameters such as fluid type, fluid temperature, pumping volume, and pump cycle time. Based on such parameters, degassing module 16 may be configured, arranged, and/or regulated to provide the necessary degassing rate/efficiency.

In one embodiment, degassing module 16 may take the form of a vacuum degassing arrangement utilizing a gas-permeable, liquid-impermeable membrane for effecting the transfer of gas out from the fluid. One example of such a membrane is a non-porous fluorinated membrane, such as a membrane fabricated from Teflon AF®, available from E.I. du Pont de Nemours and Company. The separation membrane itself may be qualified for an application such as that illustrated in FIG. 1 as having known permeation rates for certain gaseous species, as well as known selectivity values. Accordingly, degassing efficiency of degassing module 16 may be adjusted through interchangeable use of different separation membrane materials. Alternative separation membrane materials include microporous materials manufactured from PTFE, EPTFE, PVDF, polypropylene, polymethylpentene, and surface fluorinated versions of polypropylene and polymethylpentene. Microporous materials suitable for use with the present invention may be able to withstand water penetration when a differential pressure of between 15 and 60 psig is applied across the wall of a tubular membrane. More generally, water should not penetrate the porous structure of such materials when a pressure differential of 120 psig is applied across the wall of a tubular membrane. Additionally, air flow through such microporous materials may be at least 0.1 sccm per linear inch per psi air differential applied across the wall of the membrane.

Adjustable degassing efficiency of degassing module 16 may also be accomplished through adjustable separation membrane contact areas within degassing module 16. For example, degassing module 16 may incorporate optional and/or alternative fluid flow paths therethrough, which flow paths contain different amounts of separation membrane contact areas. Accordingly, selection of, for example, a larger separation membrane contact area flow path may be utilized for applications or situations in need of a greater degassing efficiency.

An additional technique for adjusting the degassing efficiency of degassing module 16 is through the adjustment of a vacuum (pressure) level at a permeate side of the separation membrane in a vacuum degassing arrangement. For example, adjustably reduced total pressure at a permeate side of the separation membrane within degassing module 16 correspondingly reduces respective partial pressures of the gaseous species desired to be removed from the fluid. Such reduction in partial pressures exerted at the permeate side of the separation membrane increases the driving force of the target gas species across the separation membrane from the fluid. The increase in separation driving force, in turn, increases the degassing efficiency of degassing module 16.

For the purposes of this application the term "degassing efficiency" means the percentage of a target gas that the degassing module is capable of removing over a fixed period of time from a fluid flowing at a fixed flow rate through the degassing module.

Certain embodiments of system 10 contain substantially known values for pump cycle time and pump cycle volume. In the alternative, adjustable systems may be controlled to maintain desired values for pump cycle time and pump cycle volume. In such applications, degassing module 16 need not possess efficiency adjustment characteristic, but may instead be specifically configured to provide an efficiency level that is sufficient to render fluid at outlet 19 that has no greater than a predetermined maximum gas concentration. Consequently, degassing efficiency characteristic variables, such as separation membrane material, separation membrane contact area, permeate side total pressure, permeate side partial pressure(s) and the like may be assigned at the manufacturing level, such that a particular degassing module 16 may be specifically manufactured for a target set of fluid conditions in system 10. In effect, such a degassing module design criteria enables the custom manufacture of degassing module 16, which provide an acceptable degassing efficiency for the application, and are therefore neither "undersized" in being unable to provides adequate degassing efficiency, nor "oversized" in utilizing excessive volume and/or energy in degassing the fluid stream beyond that which is required by the system.

The invention has been described herein in considerable detain in order to provide those skilled in the art with the information needed to apply the novel principles and to construct and use embodiments of the invention as required. However, it is to be understood that various modifications to the invention can be accomplished without departing from the scope of the invention itself.

What is claimed is:

1. A method for degassing a fluid, said method comprising:
    (a) providing a degassing system having a degassing module and a fluid pump apparatus including a fluid reservoir;
    (b) operating said fluid pump apparatus in a discontinuous mode involving one or more discrete pumping cycles between each discontinuity, said one or more discrete pumping cycles having a first cycle time;
    (c) calibrating said fluid pump apparatus to deliver a predetermined volume of said fluid from said fluid reservoir during each of said pumping cycles;
    (d) obtaining degassing characteristics including fluid identification and initial gas concentration in said fluid at said fluid reservoir;
    (e) configuring said degassing module based upon said degassing characteristics and to operably remove gas from said fluid to an extent sufficient to render said predetermined fluid volume to a predetermined maximum gas concentration upon the expiration of a period of time that is substantially equal to said first cycle time, said degassing module being fluidly coupled to said fluid pump apparatus; and
    (f) causing said fluid pump apparatus to transport said fluid through said degassing system.

2. A method for degassing a fluid as in claim 1 wherein said fluid pump is a piston displacement pump.

3. A method for degassing a fluid as in claim 1 wherein a control mechanism adjustably controls degassing efficiency of said degassing module based upon said degassing characteristics, said first cycle time, and said predetermined fluid volume, said degassing efficiency maintaining degassing of said predetermined fluid volume to said predetermined maximum gas concentration upon the expiration of said period of time.

4. A method for degassing a fluid as in claim 3 wherein said control mechanism adjusts said degassing efficiency through an adjustment modification to said degassing module, said adjustment modification being selected from the group consisting of:
    (a) replacing a first separation membrane with a second separation membrane having different permeation or selectivity characteristics than said first separation membrane;
    (b) changing separation membrane contact area within said degassing module; and
    (c) changing a gas pressure at a permeate side of said separation membrane.

5. A method for degassing a fluid as in claim 4 wherein said gas pressure is total pressure.

6. A method for degassing a fluid as in claim 4 wherein said gas pressure is a partial pressure exerted by a target gas species.

* * * * *